US005761356A

United States Patent [19]
Li

[11] Patent Number: 5,761,356
[45] Date of Patent: Jun. 2, 1998

[54] APPARATUS AND METHOD FOR COUPLING HIGH INTENSITY LIGHT INTO LOW TEMPERATURE OPTICAL FIBER

[75] Inventor: Kenneth Li, Arcadia, Calif.

[73] Assignee: Cogent Light Technologies, Inc., Santa Clarita, Calif.

[21] Appl. No.: 699,230

[22] Filed: Aug. 19, 1996

[51] Int. Cl.$^6$ ........................................ G02B 6/32
[52] U.S. Cl. ........................................ 385/38
[58] Field of Search ................ 372/38, 50, 19, 372/92, 96, 99; 385/32, 27, 38, 78, 80, 88, 62, 92; 359/333, 337, 29, 559, 900, 385

[56] References Cited

U.S. PATENT DOCUMENTS

| | | | |
|---|---|---|---|
| 4,323,009 | 4/1982 | Harris | 359/385 |
| 4,516,833 | 5/1985 | Fusek | 359/29 |
| 4,986,622 | 1/1991 | Martinez | 350/96.16 |
| 5,033,054 | 7/1991 | Scifres et al. | 359/29 |
| 5,354,977 | 10/1994 | Roustaei | 235/472 |
| 5,365,535 | 11/1994 | Yamaguchi et al. | 372/38 |
| 5,436,759 | 7/1995 | Dijaili et al. | 359/333 |
| 5,446,818 | 8/1995 | Baker et al. | 385/78 |
| 5,452,392 | 9/1995 | Baker et al. | 385/92 |

*Primary Examiner*—Akm E. Ullah
*Attorney, Agent, or Firm*—Rothwell, Figg, Ernst & Kurz

[57] ABSTRACT

A method and apparatus for coupling high intensity light into a low melting temperature optical fiber which uses a high temperature, low NA optical fiber as a spatial filter between a source of high intensity light and a low melting temperature, low NA optical fiber. The source of light may be a high intensity arc lamp or may be a high NA, high melting temperature optical fiber transmitting light from a remote light source.

17 Claims, 4 Drawing Sheets

APPARATUS AND METHOD FOR COUPLING HIGH INTENSITY LIGHT INTO LOW TEMPERATURE OPTICAL FIBER

BACKGROUND OF THE INVENTION

1. Field of the Invention

This invention relates generally to high intensity illumination systems and more particularly relates to optical transmission systems using fiber optic light guides to carry light from high intensity, high temperature light sources. More specifically, this invention relates to apparatus and methods for coupling light from a high intensity light source into low temperature optical fibers.

2. Description of the Related Art

In the field of fiber optic transmission systems, it is known to use high intensity, high thermal output light sources such as, for example, mercury arc, metal halide arc, or xenon arc lamps, which have typical operating power in the range of 35 to 1000 watts. See U.S. Pat. No. 4,757,431, issued Jul. 12, 1988 and assigned to the same assignee herein. These light sources are used with a fiber optic light guide that may consist of a single fiber or a bundle of many small fibers. Standard fiber bundles typically consist of low melting temperature glass in contrast to fused silica or quartz for which the melting temperature is approximately 1000° C. higher. Such systems have particular use in medical and industrial applications and are used in conjunction with instruments such as endoscopes, boroscopes and the like.

Coupling light from a high intensity light source into a light guide requires the condensing and focusing of light, and its concentration results in a high power density at the focal point. The temperature rises at the focal point depends on the extent to which the light is absorbed. Larger spot sizes are associated with lower temperature rise a small degree of absorption will result in a large increase in temperature. To reduce the temperature rise, the power density must be reduced as associated with larger spot sizes. To prevent a fiber bundle from melting, IR filters are typically placed between the light source and the bundle. As the focal point decreases in size, higher melting temperature materials such as quartz become necessary. As noted in U.S. Pat. No. 4,757,431, efficient methods exist for focusing the light down to a diameter of 1 mm or smaller and result in a much higher power density at the optical fiber target than is found with illumination systems delivering light through a fiber bundle. Such high power densities require light guides consisting of higher melting temperature materials to prevent melting of the optical fiber at the point of coupling of the light into the fiber. This applies to either single fiber light guides or small diameter (1 mm or smaller) fiber bundles.

Optical fibers made of quartz are expensive, and it is necessary that such optical fibers be used over a sufficiently long time period to justify their cost. In a surgical environment, this means that such optical fibers be sterilized after each use. Since sterilization techniques typically involve the use of chemical disinfectants, fiber optic light guides must be made to withstand thermal damage and damage from the use of such chemicals as well as from thermal damage. Additionally, quartz fibers are relatively brittle and difficult to bend without breaking, requiring a high degree of care during manipulation.

Although standard glass (e.g. borosilicate) fiber bundles are made of relatively inexpensive materials, their performance in transmission over long fiber lengths is limited by the transmissivity of the materials and packing losses. In addition, the low melting temperature of the glass places limitations on the smallest size bundle that can be coupled to a high intensity light source.

Coupling a fiber optic device, such as a microendoscope having an illumination aperture of 2 mm or less, to a typical light-delivering fiber bundle 3 to 5 mm in diameter is inefficient and results in poor light transmission to the optical device. The inefficiency arises from the mismatch in area. Reducing the size of the fiber bundle to match that of the device causes substantial coupling losses from the source, while narrowing the focus to a small diameter bundle results in melting of the bundle.

In general, the size of the light guide coupled to a fiber optic device should be matched to the diameter of the device. Hence for small diameter fiber optic devices (e.g. less than 2 mm) a single high temperature fiber or high temperature fiber bundle is necessary. Single fiber light guides having a diameter of 1 mm or less coupled to a source of light are more efficient than a bundle of similar size since bundles have inherent packing losses. Because single quartz or glass fibers over 1 mm diameter are generally too stiff for practical use, fiber bundles are typically used for applications requiring diameters greater than 1 mm.

Whereas single quartz fibers and glass fiber bundles are useful and effective in transmitting light, they are not the least expensive way of transmitting light. Plastic optical fibers are both inexpensive and highly flexible, even at diameters greater than 1 mm. Accordingly, it would be desirable to use these low cost plastic fibers in conjunction with high intensity light sources. Like glass bundles, however, plastic has a much lower melting temperature than quartz. Therefore, use of a single plastic fiber to deliver sufficient illumination requires an intermediate light delivery system between the plastic fiber and the light source.

One example of an application in which low cost plastic fibers or small diameter, lower cost glass fiber bundles would be useful is the medical field. Use of low cost fibers would enable light guides for lighted instruments in medicine to be sold as a single use, sterile product eliminating the need for sterilization after each use. The use of small bundles coupled to a single, high intensity quartz fiber would enable smaller devices to be manufactured. However, neither plastic fibers nor small diameter glass fiber bundles can withstand the high temperature generated at the focal point of a light source which is condensed and focused into a small spot commensurate in size with the diameter of such light guides.

U.S. Pat. No. 4,986,622 issued Jan. 22, 1991, discloses one prior art attempt at solving the problem of avoiding thermal damage to low temperature plastic fibers. The '622 patent discloses a light transmission apparatus coupling a heat resistant glass fiber optic bundle at the output of a high intensity light source. The glass optical fiber bundle is then mechanically close-coupled to a plastic fiber optic bundle in a standard connector. The '622 patent requires a mechanical matching of the glass fiber bundle to the plastic fiber bundle in order to avoid the generation of a significant amount of heat at the coupling point, which would damage the plastic fiber bundle.

The '622 patent requires that the diameter of the glass bundle be less than or equal to the diameter of the plastic bundle. This is to allow the cone of light emanating from the glass bundle to be transmitted into the plastic bundle without light loss. In practice, however, this is efficient only if there is also an optical specification with respect to the cone-angle of light (i.e., numerical aperture (NA)) for each bundle or optical fiber and the spacing between them. The '622 patent fails to recognize this requirement. Moreover, if the diameter of the glass bundle were significantly smaller than that of the plastic bundle, thermal damage to the plastic fiber would result at high power densities if a sufficient enough amount of light were coupled from the light source.

In the context of the '622 patent, it appears that typical 3 or 5 mm diameter bundles are used, since the connection between glass and plastic fiber bundles is that typically found in medical lighting equipment. Such connectors make use of a proximity coupling between fiber bundles with minimal spacing at the junction and rely upon a matching of the relative diameters of the bundles. For higher power densities, such connectors would cause damage to the low melting temperature fiber bundle.

Additionally, the '622 solution is insufficient to maximize light output from a low temperature fiber coupled to a high temperature single fiber delivering light from a high intensity source.

There remains a need in the art for improvement in methods and apparatus for coupling high intensity light into low melting temperature optical fibers.

SUMMARY OF THE INVENTION

The present invention provides a method and apparatus for coupling high intensity light into a low melting temperature optical fiber which uses a high temperature optical fiber of specified numerical aperture (NA) as a spatial filter between a source of high intensity light (at least 400 mW/mm$^2$) and a low melting temperature, low NA optical fiber. The spatial filter not only allows the low melting temperature optical fiber to be removed from the focus point of the high intensity light, but also dissipates unguided modes of light transmission before they enter the low temperature optical fiber. The spatial filter may be placed between the focus of a high intensity light source and a low melting temperature optical fiber, and alternatively may be placed between a high NA, high melting temperature optical fiber and a low temperature, low NA optical fiber. The source of high intensity light may be a direct source focused to a spot of less than 2 mm or alternatively may be from a second single fiber coupled to a high intensity light source. If the numerical aperture of the receiving fiber is less than that of the spatial filter a spaced apart configuration is required with a mechanical heat sink if the light intensity is higher than about 400 mW/mm$^2$. If the numerical apertures are equal or that of the receiving fiber is larger than that of the spatial filter, then the extent to which the fibers are spaced apart and the requirement for mechanical heat sinking is dependent upon the relative diameters of the fibers, the wavelength of light, and the power density.

BRIEF DESCRIPTION OF THE DRAWINGS

The present invention will become more fully understood from the detailed description given hereinbelow and the accompanying drawings, which are given by way of illustration only and which are not limitative of the present invention, and wherein.

DETAILED DESCRIPTION OF THE PREFERRED EMBODIMENTS

Figure 3:
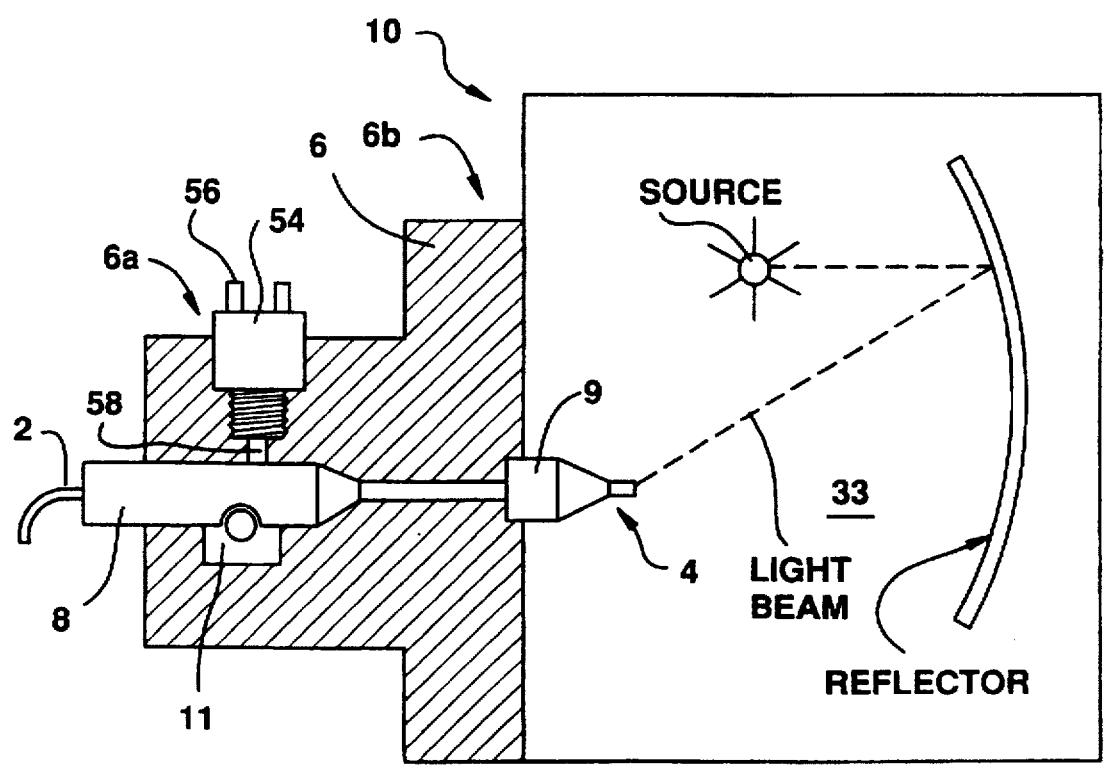
FIG. 3 is a diagram of a high intensity illumination system which can be used with the present invention.

An example of a source of high intensity light such as contemplated by the present invention is shown in FIG. 3. Light source housing 10 includes a light source (typically, a high intensity arc lamp such as xenon or mercury arc lamp or any other visible electromagnetic radiation source capable of being focused to a power density of at least 400 mW/mm$^2$) and a concave reflector for collecting and condensing light from the source onto the input end 4 of an optical fiber 2. The operation of the collecting and condensing system is described in the aforementioned U.S. Pat. No. 4,757,431. A receiving block 6 made of high thermal conductivity metal (i.e., aluminum) is attached to one of the walls of housing 10 for securing a connector 8 containing optical fiber 2, inserted into end 6a of block 6, to the housing. The housing 10 also contains a bushing 9, which is secured to block 6 at end 6b.

Connector 8 is secured to block 6 through a locking mechanism 11. A push button switch 54 is disposed in the block 6 with a push button 58 being provided to keep the shutter of the light source closed in order to protect a user's eyes from the high intensity light in the absence of a connector 8 being present. Leads 56 connect to circuitry for operating the shutter when push button 58 is pushed in by the presence of the connector 8.

The nature of the light source system 33 is such that a very high light flux density is focussed onto the small area of the input end 4 of the fiber 2. The focussed light spot will include light of high divergence angles, which will cause a large number of propagation modes to enter the fiber. However, the number of modes which may be propagated or guided in the fiber is limited by the physical characteristics of the fiber, including such factors as the NA of the fiber and the radius of the fiber core.

Because of area and mode mismatching, only a fraction of the focused light is actually transmitted by the fiber. The remaining light is either absorbed in the area surrounding the input end of the fiber, causing the generation of a significant amount of heat, or enters the fiber in unguided modes, which the fiber is incapable of propagating.

Figure 1:
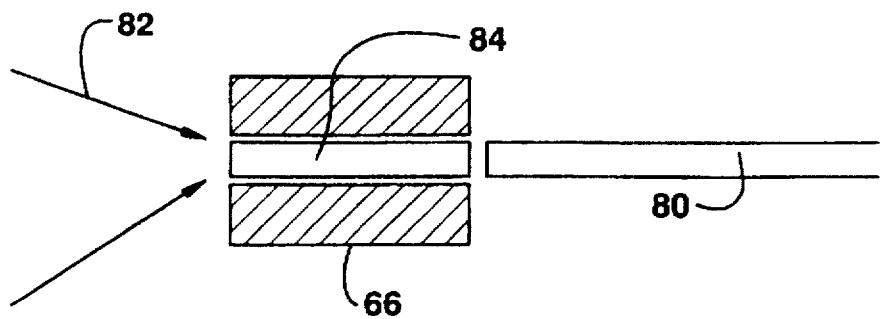
FIG. 1 is a diagram illustrating the general concept of the spatial filter according to the present invention.

FIG. 1 illustrates the general concept of the present invention. High intensity light 82 containing high divergence angle components is focused onto a short section of heat resistant optical fiber made of high melting temperature material. One example of such a high melting temperature fiber is a quartz fiber; however, any other suitable high melting temperature material may be used. The high temperature fiber 84 is surrounded by a heat sink 66, which is made of thermally conductive material, for example metal.

The high temperature fiber 84 is able to withstand the heat generated by that light which does not enter the fiber but which is incident on the area surrounding the input end of the fiber. Additionally, the section of fiber is long enough such that the fiber functions as a spatial filter, in which all unguided modes of light entering the input end of the fiber are fully dissipated within the length of the fiber 84. Consequently, the output of the fiber 84 will consist of guided modes of light only which will be coupled as guided modes of the low melting temperature optical fiber 80. Optical fiber 80 is made of materials such as plastic or soft glass such as borosilicate, for example. Since only guided modes are coupled into low temperature fiber 80, there is no generation of excess heat between the output end of fiber 84 and the input end of fiber 80. Ideally, the numerical aperture of the high temperature fiber should be equal to or less than the numerical aperture of the low melting temperature fiber. However, even if the numerical aperture of the high temperature fiber is higher, spatial filtering of the light from the source will eliminate high order modes that would be converted into heat.

Depending on the purity and melting temperature of the low temperature fiber, additional measures may be necessary to ensure no thermal damage. Plastic fibers often have impurities which will absorb light, causing thermal runaway. The effect is more noticeable when the numerical aperture of the high temperature fiber is greater than that of the low temperature fiber. For example, at high power densities light that is absorbed just inside the surface of a plastic receiving fiber may cause melting and cratering of the plastic fiber surface. This effect is more pronounced when the NA of the plastic fiber is lower than the NA of the high temperature fiber. This effect can be eliminated by spacing the fibers apart and providing a heat sink to carry away resulting thermal energy. The actual spacing depends on the power density and the NA.

For example, for a 0.47 mm diameter quartz fiber of NA=0.68 delivering 2 watts of visible light (410 nm to 650 nm) to a 1 mm diameter polymethacrylate fiber of NA=0.55, the required spacing is at least 1.7 mm to avoid thermal damage to the plastic fiber. At this spacing, some of the higher angle light exiting the high temperature fibe diverges from the aperture of the plastic fiber, thus providing an additional means of spatial filtering. With the same spacing and a 1.5 mm diameter plastic fiber, the total power transmitted would be twice that of the 1 mm fiber. In both cases, the amount of light transmitted to the plastic fiber without damage is considerably greater than what is possible by coupling directly to the light source. The spaced apart configuration decreases the intensity of light impinging on the surface of the fiber and decreases the probability of reaching threshold absorption within the fiber, which would cause thermal damage. The heat generated by the excess light requires the use of a heat sink.

The melting threshold of plastic fiber depends on the composition of the fiber and level of impurities. Materials that absorb the wavelengths of light transmitted from the spatial filter tend to lower the amount of light able to be coupled without damage. Similarly, if the NA of the spatial filter is greater than that of the receiving plastic fiber, the coupling efficiency is diminished and the damage threshold is thus lower for the same spacing as when the NA of the spatial filter is less than that of the receiving plastic fiber. By contrast, coupling high intensity light from a 0.68 NA quartz single fiber to a 1 mm borosilicate bundle of NA=0.86 or 0.55 requires no specific spacing (the only spacing requirement is that the single fiber be placed so that light just fills the aperture of the bundle) and can withstand 2 watts of transmitted light power for a number of hours. This result is primarily from the higher melting temperature of borosilicate as compared with plastic. Similar results would be expected with a single borosilicate fiber (1 mm diameter). Care must be taken to avoid contamination at the surface of the receiving fibers, as thermal degradation and runaway is highly likely due to absorption by the contaminant.

Figure 2A:
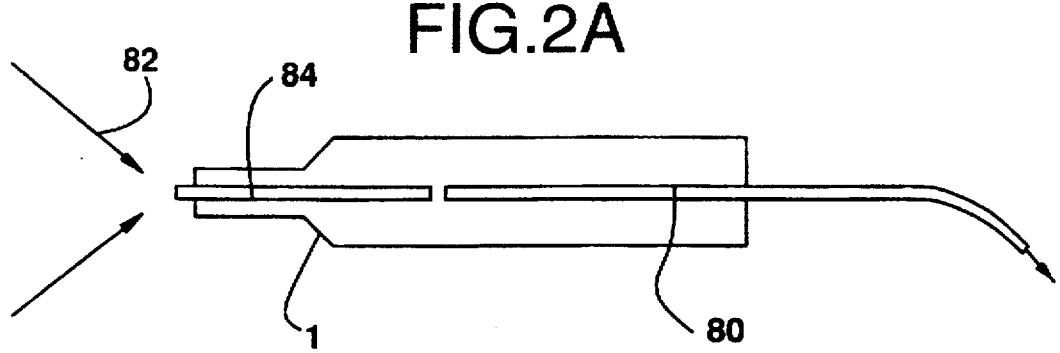
FIGS. 2a-2c illustrate respective alternate embodiments of the present invention as implemented with a proximal connector.
Figure 2B:
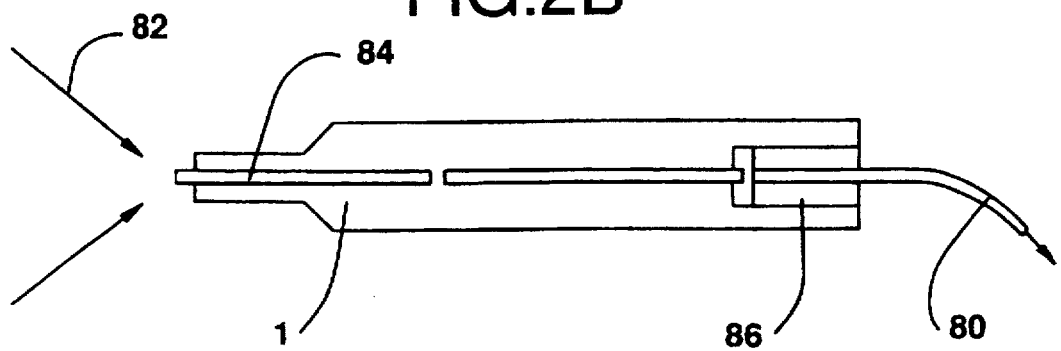
Figure 2C:
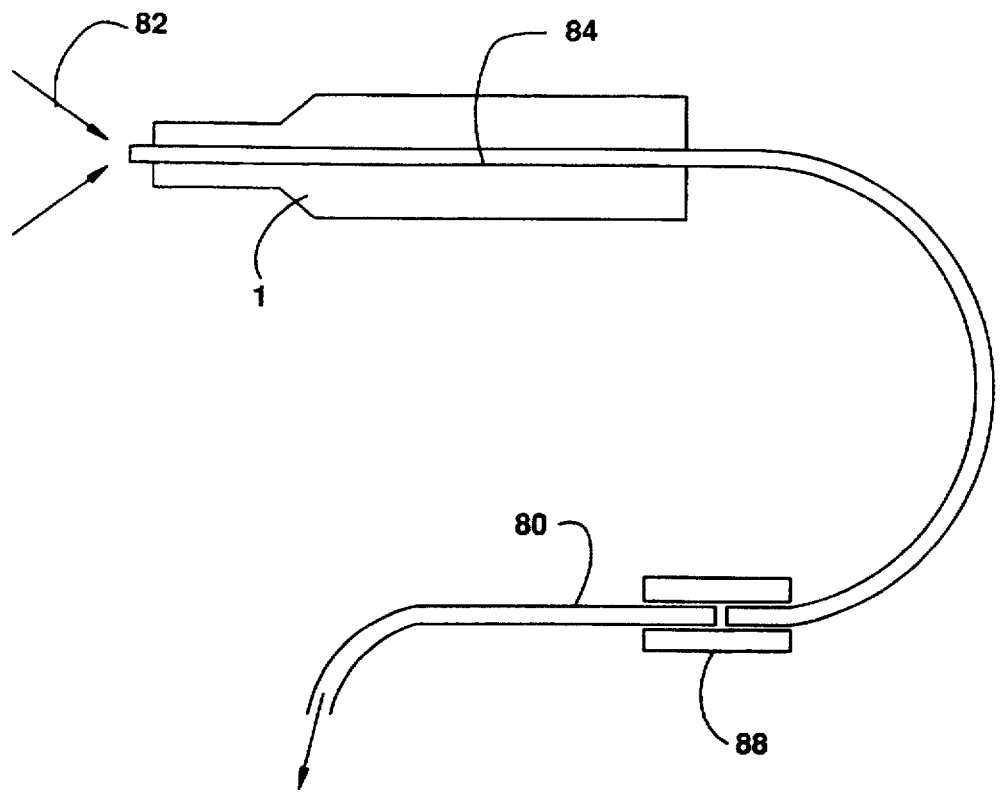

FIGS. 2a–2c illustrate various alternate specific embodiments of the present invention as described above in connection with FIG. 1. FIG. 2a illustrates a first embodiment wherein the spatial filter-to-low melting temperature fiber connection is within a proximal connector 1, such that the use of a high temperature fiber is not apparent to the user.

Figure 4:
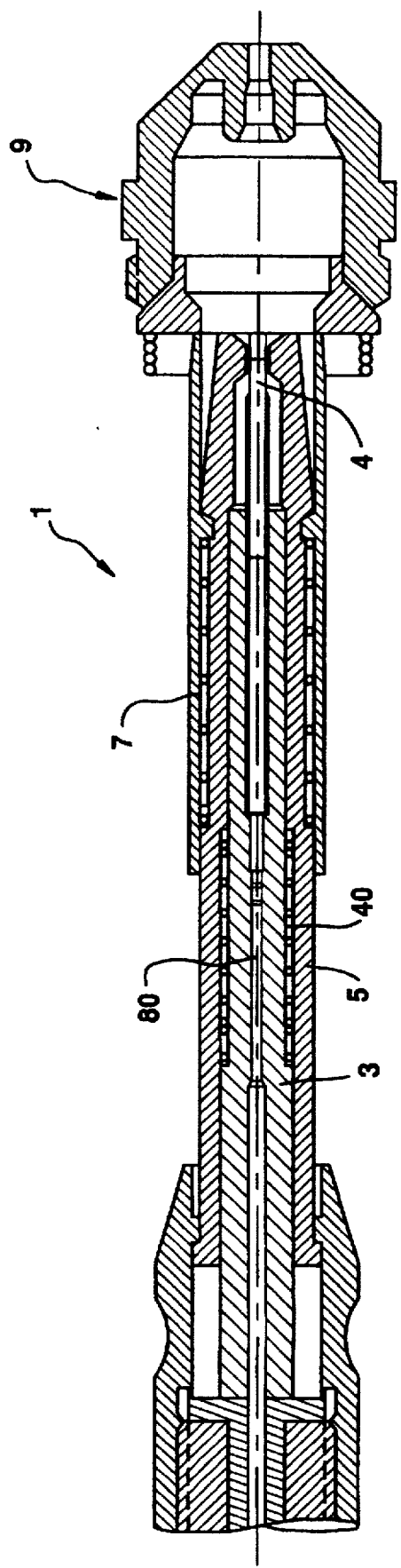
FIG. 4 is a diagram showing one specific embodiment of a proximal connector for use in the present invention.

An example of such a proximal connector is shown in FIG. 4. Connector 1 is made up of a barrel 3, a collet 5 and a protective sleeve 7 which protects the input end 4 of the optical fiber 84 when not connected to bushing 9. Heat sink 66 is in the form of a fiber support tube. Further details of the connector 1 are described in U.S. Pat. No. 5,452,392 and will not be repeated herein.

FIG. 2b illustrates a second embodiment wherein the low temperature fiber 80 is attached to a separate connector 86 which can be plugged into connector 1. In this embodiment, the proximal connector 1 is reusable, while the low temperature fiber 80 is disposable.

FIG. 2c shows a third possible embodiment in which high temperature fiber 84 extends outside of proximal connector 1 and is coupled to low temperature fiber 80 through an external connector 88.

In all three embodiments, the fiber-to-fiber connection requires a spaced apart configuration and heat sinking at the connection when the low melting temperature fiber is composed of plastic. For higher temperature fibers such as borosilicate, the spacing is less critical.

Figure 5:
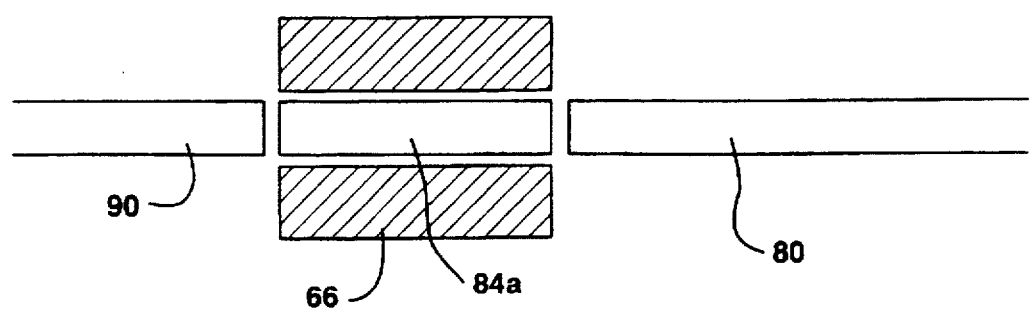
FIG. 5 shows an alternate embodiment of the present invention wherein the spatial filter is used to couple light from a high NA optical fiber to a low temperature, low NA optical fiber.

FIG. 5 shows another alternate embodiment of the invention which increases the amount of light able to be transmitted through a plastic fiber without damage. Whereas a high NA quartz fiber is able to couple substantially more light from an arc source than a lower NA fiber, the resultant spatial filtering is less than optimal if the NA of the receiving low melting temperature fiber is less than that of the quartz fiber. This situation can be remedied either by matching the NA of the spatial filtering fiber to be less than or equal to the NA of the light receiving plastic fiber, or by incorporating a second fiber of NA equal to or less than that of the plastic fiber as a spatial filter between the high NA quartz fiber and the receiving plastic fiber. This configuration enables at least 50% more light to be coupled into a plastic receiving fiber than direct coupling without such a spatial filter.

In practice, there is a limit to which filtering will successfully eliminate melting of the plastic fiber because of absorption by color centers within the plastic fiber. Ultimately, the upper bound is determined by the absorptivity of the low melting temperature fiber, its purity, and the presence of contaminants at the interface between fibers. Maximizing the intensity of transmitted light to a plastic fiber is dependent on the power density of light emitted by the spatial filter, the characteristics of the mechanical heat sink, and the amount of spacing between fibers. Generally, when power density exceeds 400 mW/mm$^2$ a spaced apart configuration is required and the connector must be able to function as a heat sink.

In FIG. 5, the spatial filtering fiber 84a of low NA is used to couple light from a high temperature, high NA optical fiber 90 into a low temperature, low NA optical fiber 80. The optimum relationship of the NAs of the system is $NA_{fiber\ 90} > N_{fiber\ 84a} \leq NA_{fiber\ 80}$. The high NA light energy outputted by fiber 90 will not be propagated by the low NA spatial filter but will be dissipated within its length. Heat generated by such dissipation will be conducted away from fiber 84a by heat sink 66. Only low NA guided modes will be outputted by fiber 84a and coupled into low temperature fiber 80. As such, low temperature operation of fiber 80 can be maintained. As compared with the prior art, the amount of light able to be coupled to a low melting temperature plastic fiber is 3 to 5 greater.

In the preferred embodiments of the present invention, the optical fibers are single core fibers of diameter from 0.1 mm to 1.0 mm. However, the principles of the invention may be applied equally to optical fiber bundles.

The invention having been thus described, it will be apparent to those skilled in the art that the same may be varied and modified in many ways without departing from the spirit and scope of the invention. Any and all such modifications are intended to be included within the scope of the following claims.

What is claimed is:

1. Apparatus for coupling high intensity light of at least 400 mW/mm$^2$ into a low melting temperature optical fiber, comprising:

a spatial filter composed of high melting temperature material for receiving said high intensity light, dissipating unguided modes of light within the length of said spatial filter, and substantially only guided modes of light;

a heat sink in proximity to said spatial filter for absorbing heat generated by said spatial filter and conducting said heat away from said spatial filter; and a low melting temperature optical fiber for substantially only guided modes of light from said spatial filter at an input end thereof, propagating said guided modes of light along a body of said low melting temperature optical fiber, and outputting said guided modes of light at an output end thereof.

2. Apparatus according to claim 1, wherein said spatial filter comprises a single quartz optical fiber.

3. Apparatus according to claim 1, wherein the numerical aperture of said low melting temperature optical fiber is equal to or greater than the numerical aperture of said spatial filter.

4. Apparatus according to claim 1, wherein said spatial filter receives said high intensity light from a high intensity light source.

5. Apparatus according to claim 1, wherein said spatial filter receives said high intensity light from a high NA optical fiber.

6. Apparatus according to claim 1, wherein said low melting temperature optical fiber is made of borosilicate material.

7. Apparatus according to claim 1, wherein said heat sink is made of metal.

8. Apparatus according to claim 1, further comprising a connector attached to said low melting temperature optical fiber for connecting said low melting temperature optical fiber to a light source system which provides said high intensity light, said spatial filter being located within said connector.

9. Apparatus according to claim 1, further comprising a first connector for attachment at one end thereof to a light source system which provides said high intensity light, said spatial filter being located within said connector, and said low melting temperature optical fiber being coupled to a second connector, said second connector being inserted into said first connector at a second end thereof, for coupling light from said spatial filter into said low melting temperature optical fiber.

10. Fiber optic coupling apparatus for coupling high intensity light of at least 400 mW/mm$^2$ from a light source system into a low melting temperature optical fiber, comprising:

a connector coupled to said low melting temperature optical fiber for connecting said low melting temperature optical fiber to said light source system;

a spatial filter composed of high melting temperature material, located within said connector between said light source system and said low melting temperature optical fiber, for receiving said high intensity light, dissipating unguided modes of light within the length of said spatial filter, and substantially only guided modes of light into said low melting temperature optical fiber.

11. Apparatus according to claim 10, wherein said spatial filter comprises a single quartz optical fiber.

12. Apparatus according to claim 10, wherein the numerical aperture of said low melting temperature optical fiber is equal to or greater than the numerical aperture of said spatial filter.

13. Apparatus according to claim 10, wherein said low melting temperature optical fiber is made of borosilicate material.

14. A method for coupling high intensity light of at least 400 mW/mm$^2$ into a low melting temperature optical fiber, comprising the steps of:

providing a spatial filter composed of a single, high melting temperature optical fiber for receiving said high intensity light, dissipating unguided modes of light within the length of said spatial filter, and substantially only guided modes of light;

providing a heat sink in proximity to said spatial filter for absorbing heat generated by said spatial filter and conducting said heat away from said spatial filter; and coupling a low melting temperature optical fiber to said spatial filter for substantially only guided modes of light from said spatial filter at an input end thereof, propagating said guided modes of light along a body of said low melting temperature optical fiber, and outputting said guided modes of light at an output end thereof.

15. Apparatus according to claim 1, wherein said low melting temperature optical fiber comprises a bundle of a plurality of small diameter, low melting temperature optical fibers.

16. Apparatus according to claim 1, wherein said low melting temperature optical fiber is made of light transmitting plastic material.

17. Apparatus according to claim 10, wherein said low melting temperature optical fiber is made of light transmitting plastic material.

* * * * *

UNITED STATES PATENT AND TRADEMARK OFFICE
CERTIFICATE OF CORRECTION

PATENT NO. : 5,761,356
DATED : June 2, 1998
INVENTOR(S) : Kenneth Li

It is certified that error appears in the above-identified patent and that said Letters Patent is hereby corrected as shown below:

Column 1,
Lines 59-60, "as well as from thermal damage" should be deleted;

Column 7,
Line 19, before "substantially" insert -- outputting --;
Line 24, before "substantially" insert -- receiving --;

Column 8,
Line 35, after "filter, and" insert -- outputting --;
Line 41, after "filter for" insert -- receiving --.

Signed and Sealed this

Twelfth Day of February, 2002

Attest:

JAMES E. ROGAN
Attesting Officer
Director of the United States Patent and Trademark Office